(12) United States Patent
Lee et al.

(10) Patent No.: US 8,823,339 B2
(45) Date of Patent: Sep. 2, 2014

(54) SWITCH CONTROL CIRCUIT, CONVERTER USING THE SAME, AND SWITCH CONTROLLING METHOD

(75) Inventors: Jae-Yong Lee, Seongnam (KR); Byung Kwon Choi, Bucheon (KR); Young-Je Lee, Bucheon (KR); Ilyong Jung, Bucheon (KR)

(73) Assignee: Fairchild Korea Semiconductor Ltd., Bucheon (KR)

( * ) Notice: Subject to any disclaimer, the term of this patent is extended or adjusted under 35 U.S.C. 154(b) by 260 days.

(21) Appl. No.: 13/313,816

(22) Filed: Dec. 7, 2011

(65) Prior Publication Data

US 2012/0170335 A1    Jul. 5, 2012

(30) Foreign Application Priority Data

Jan. 5, 2011    (KR) .................. 10-2011-0001137

(51) Int. Cl.
  *H02M 3/156*    (2006.01)
  *H02M 1/34*    (2007.01)
(52) U.S. Cl.
  CPC ............. *H02M 3/156* (2013.01); *H02M 1/34* (2013.01)
  USPC ............................ 323/235; 323/207; 363/89
(58) Field of Classification Search
  USPC ............... 323/235, 319, 207, 222; 363/89–90
  See application file for complete search history.

(56) References Cited

U.S. PATENT DOCUMENTS

| | | | |
|---|---|---|---|
| 7,313,007 B2* | 12/2007 | Wu et al. .................. | 363/65 |
| 8,467,209 B2* | 6/2013 | Adragna .................. | 363/89 |
| 2006/0022648 A1* | 2/2006 | Ben-Yaakov et al. ......... | 323/222 |
| 2010/0225290 A1* | 9/2010 | Nalbant ................. | 323/282 |

OTHER PUBLICATIONS

MC33260 Product Review—Greenline Compact Power Factor Controller: Innovative Circuit for Cost Effective Solutions, Nov. 1999—Rev. 1, pp. 1-20, ON Semiconductor.
R2A20113DD/SP—Critical Conductor Mode PFC Control IC, Oct. 10, 2008—Rev. 1.00, pp. 1-7, Renesas Technology Corp.
Fuji Power Supply Control IC—Power Factor Correction FA5590/FA5591 Application Note, Apr. 2011, pp. 1-21, Fuji Electric Co., Ltd.

* cited by examiner

*Primary Examiner* — Harry Behm
(74) *Attorney, Agent, or Firm* — Okamoto & Benedicto LLP (57) ABSTRACT

The present invention relates to a switch control circuit, a switch control method, and a converter using the same.
An input voltage rectified from an AC input in a converter is transmitted to an inductor, and output power is generated from an inductor current by the input voltage. The converter includes a power switch connected to the inductor to control the inductor current and a sense resistor having a first end connected to a ground and a second end connected to the AC input. At a time point that a sense voltage generated in the sense voltage reaches the peak point and then decreased to an on-reference voltage, the power switch is turned on. The on-reference voltage is a sense voltage at a resonance start time point between a parasite capacitor of the power switch and the inductor.

19 Claims, 4 Drawing Sheets

SWITCH CONTROL CIRCUIT, CONVERTER USING THE SAME, AND SWITCH CONTROLLING METHOD

CROSS-REFERENCE TO RELATED APPLICATION

This application claims priority to and the benefit of Korean Patent Application No. 10-2011-0001137 filed in the Korean Intellectual Property Office on Jan. 5, 2011, the entire contents of which are incorporated herein by reference.

BACKGROUND (a) Field

An embodiment of the present invention relates to a converter and a driving method thereof. More particularly, the embodiment relates to a switch control circuit that can prevent hard-switching, a converter using the same, and a switch control method.

(b) Description of the Related Art

A zero current detection structure is required to control switching operation of a converter switch forming a power factor correction circuit. Zero current detection implies to detect a time point that a current flowing to an inductor of the converter becomes zero. In the converter, the switch is designed to be turned on when the current flowing to the inductor becomes zero.

A conventional power factor correction converter uses an auxiliary wire coupled to a converter inductor in an insulated manner with a predetermined turn ratio for zero current detection. A converter control circuit includes a separate pin, and is connected to the auxiliary wire and receives a zero current detection voltage corresponding to a voltage at both ends of the inductor. The converter control circuit detects a time point that the inductor current becomes zero using a zero current detection voltage, and turns on the switch at the detected time point.

However, a converter control circuit that does not include a separate pin for zero current detection directly detects a current flowing to an inductor for zero current detection. At a time point that a voltage (hereinafter, a zero detection voltage) detects a current flowing to the inductor becomes zero, a switch is turned on.

According to such a method, the switch is turned on after a predetermined time period is passed from a time point at which the detection voltage reaches a predetermined threshold voltage. A drain voltage of the switch is decreased due to resonance after the switch is turned off, and a resonance frequency is determined by the inductor and a parasite capacitor of the switch.

A delay period is determined to control the switch to be turned on when the drain voltage becomes the lowest voltage according to the resonance frequency. That is, for soft-switching, the switch is designed to be turned on after the delay period is passed from a time point that the detection voltage reaches the threshold voltage.

However, when the inductor and the parasite capacitor are changed, the resonance frequency is fluctuated such that hard-switching may occur. More particularly, when the resonance frequency is increased or decreased, the drain voltage is maintained in high level even though the delay period is passed so that hard-switching occurs.

The above information disclosed in this Background section is only for enhancement of understanding of the background of the invention and therefore it may contain information that does not form the prior art that is already known in this country to a person of ordinary skill in the art.

SUMMARY

An embodiment of the present invention has been made in an effort to provide a switch control circuit that can prevent hard-switching without having an additional pin for zero current detection and a switch control method. Further, an embodiment of the present invention provides a converter that does not experience hard-switching using the switch control circuit and the switch control method.

A converter according to an exemplary embodiment of the present invention has an inductor to which an input voltage rectified from an AC input is transmitted, and generates an output voltage using an inductor current by the input voltage. The converter includes: a power switch connected to the inductor and controlling the inductor current; a sense resistor including a first end connected to the power switch and the ground and a second end connected to the AC input; and a switch control circuit turning on the power switch at a time point that a sense voltage generated in the sense resistor is decreased to an on-reference voltage after reaching the peak point. The on-reference voltage is a sense voltage at a resonance start point between a parasite capacitor of the power switch and the inductor.

The switch control circuit calculates a rising period, that is, from a time point that the sense voltage reaches the on-reference voltage to a time point that the sense voltage reaches the peak point, and turns on the power switch after a falling period that is the same as the calculated rising period is passed from the peak point.

The switch control circuit includes: a level shifter generating a shift voltage by shifting the sense voltage by a predetermined level; a first comparator generating a first detection signal according to a comparison between the shift voltage and a threshold voltage that corresponds to the on-reference voltage; a peak detection unit generating a second detection signal by detecting the peak point of the shift voltage; a first latch generating a first control signal that indicates a rising period according to the first detection signal and the second detection signal; a second latch generating a second control signal indicating a sum period of the rising period and the falling period according to the first detection signal and an on-trigger signal; and a timing calculator calculating the rising period and the sum period according to the first control signal and the second control signal, and generating the on-trigger signal that controls turn-on of the power switch at a time point after the sum period is passed.

The timing calculator generates a timing calculating signal that is increased during the rising period by the first and second control signals and decreased during the falling period by the first control signal, and sets a time point that the timing calculation signal is decreased to a predetermined reference voltage to a termination time point of the falling period.

The timing calculator includes: a charging current source generating a charging current; a capacitor including a first end connected to the charging current and a second end being grounded; a first control switch performing switching operation according to the first control signal, and including a first end connected to the first end of the capacitor; a second control switch performing switching operation according to the second control signal, and connected to the capacitor in parallel; a discharging current source connected to the second end of the first control switch; and a second comparator including a first input end connected to the first end of the capacitor and a second input end to which the reference voltage is input, and the timing calculation signal is a voltage at the first end of the capacitor, and the charging current source and the discharging current source are set to control a time point that the sense voltage is decreased to the on-reference voltage after reaching the peak point and the termination time point of the falling period to be equivalent to each other.

The converter includes: a D-flipflop being synchronized by the on-trigger signal to generate an on signal for turning on the power switch; a third comparator generating an off signal to turn off the power switch when a sawtooth wave signal increasing during the turn-on period of the power switch reaches a comparison voltage that corresponds to a difference between a feedback voltage corresponding to the output voltage and a predetermined error reference voltage; and an SR-flipflop generating a gate signal for switching operation of the power switch according to the on signal and the off signal.

The D-flipflop is reset at a turn-off time point of the power switch. The peak detection unit is reset at a turn-off time point of the power switch.

A switch control circuit according another exemplary embodiment of the present invention includes an inductor to which an input voltage rectified from an AC input is transmitted, and controls switching operation of a power switch that controls generation of an output voltage using an inductor current by the input voltage. The switch control circuit includes: a peak detection unit detecting a time point that a sense voltage corresponding to a current flowing to the power switch reaches the peak point; and a timing calculator generating an on-trigger signal to turn on the power switch at a first time at which the sense voltage is decreased to a predetermined on-reference voltage after the determined peak point. The sense voltage is generated by a sense resistor including a first end connected to the power switch and a ground and a second end connected to the AC input, and the on-reference voltage is a sense voltage at a resonance start point between a parasite capacitor of the power switch and the inductor.

The switch control circuit further includes a first latch generating a first control signal indicating a rising period from a second time point that the sense voltage reaches the on-reference voltage before the detected peak point to the detected peak point, and the timing calculator generates the on-trigger signal at a time point that a falling period that is the same as the rising period is passed using the first control signal.

The switch control circuit further includes: a level shifter generating a shift voltage by shifting the sense voltage by a predetermined level; and a first comparator generating a first detection signal according to a result of comparison between the shift voltage with the threshold voltage corresponding to the on-reference voltage; and first comparator generating a first detection signal according to a result of comparison between the shift voltage with the threshold voltage corresponding to the on-reference voltage. The peak detection unit generates a second detection signal by detecting the peak point of the shift voltage and the first latch generates a first control signal indicating a rising period according to the first and second detection signals.

The switch control circuit further includes a second latch generating a second control signal that indicates a sum period of the rising period and the falling period according to the first detection signal and the on-trigger signal. The timing calculator generates a timing calculation signal that is increased during the rising period by the first and second control signals and decreased during the falling period by the first control signal, and sets a time point that the timing calculation signal is decreased to a predetermined reference voltage as a termination time point of the falling period.

The timing calculator includes: a charging current source generating a charging current; a capacitor including a first end connected to the charging current source and a second end being grounded; a first control switch performing switching operation according to the first control signal and including a first end connected to the first end of the capacitor; a second control switch performing switching operation according to the second control signal and connected to the capacitor in parallel; a discharging current source connected to the second end of the first control switch; and a second comparator including a first input end connected to the first end of the capacitor and a second input end to which the reference voltage is input. The timing calculation signal is a voltage at the first end of the capacitor, and the charging current source and the discharging current source are set to control a time point that the sense voltage is decreased to the on-reference voltage after reaching the peak point to be equivalent to the termination time point of the falling period.

The switch control circuit further includes: a D-flipflop generating an on signal by synchronized by the on-trigger signal to turn on the power switch; a third comparator generating an off signal to turn off the power switch when a sawtooth wave signal increasing during the turn-on period of the power switch reaches a comparison voltage that corresponds to a difference between a feedback voltage corresponding to the output voltage and a predetermined error reference voltage; and an SR-flipflop generating a gate signal that control the power switch to perform switching operation according to the on signal and the off signal.

The D-flipflop is reset at the turn-off time point of the power switch, and the peak detection unit is reset at the turn-off time point of the power switch.

A switch control method according to another exemplary embodiment of the present invention controls switching operation of a power switch having an inductor receiving an input voltage rectified from an AC input and controlling output voltage generation with an inductor current by the input voltage. The switch control method includes: detecting a first time point that a sense voltage corresponding to a current flowing to the power switch reaches a predetermined on-reference voltage; detecting the peak point of the sense voltage; and turning-on the power switch when a second period that is equivalent to a first period is passed, the first period is a period from the first time point to the peak point. The sense voltage is generated by a sense resistor including a first end connected to the power switch and a ground and a second end connected to the AC input, and the on-reference voltage is a sense voltage at a resonance start time point between a parasite capacitor of the power switch and the inductor.

The turning-on of the power switch includes generating a timing calculation signal that is increased during the first period and decreased during the second period and setting a time point that the timing calculation signal is decreased to a predetermined reference voltage as a termination time point of the second period.

The switch control method further includes generating a shift voltage by shifting the sense voltage by a predetermined level. The detecting of the first period is performed according to a result of comparison between the shift voltage and a threshold voltage corresponding to the on-reference voltage, and the detecting of the peak point is performed by detecting the peak point of the shift voltage.

The switch control method further includes turning off the power switch when a sawtooth wave signal increasing during the turn-on period of the power switch reaches a comparison voltage that corresponds to a difference between a feedback voltage corresponding to the output voltage and a predetermined error reference voltage. The detecting of the peak point comprises generating a detection signal which is a pulse during the peak point of the shift voltage to the turn-off time point of the power switch, and the turning on of the power switch comprises setting a period from the first time point to a time point that the detection signal is generated to the first period.

The present invention provides a switch control circuit, a switch control method, and a converter that can control switching operation of a converter without additional auxiliary wires and a pin for zero current detection and prevent hard switching.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims that follow, when it is described that an element is "coupled" to another element, the element may be directly coupled to the other element or electrically coupled to the other element through a third element. In addition, unless explicitly described to the contrary, the word "comprise" and variations such as "comprises" or "comprising" will be understood to imply the inclusion of stated elements but not the exclusion of any other elements.

In the following detailed description, only certain exemplary embodiments of the present invention have been shown and described, simply by way of illustration.

Figure 1:
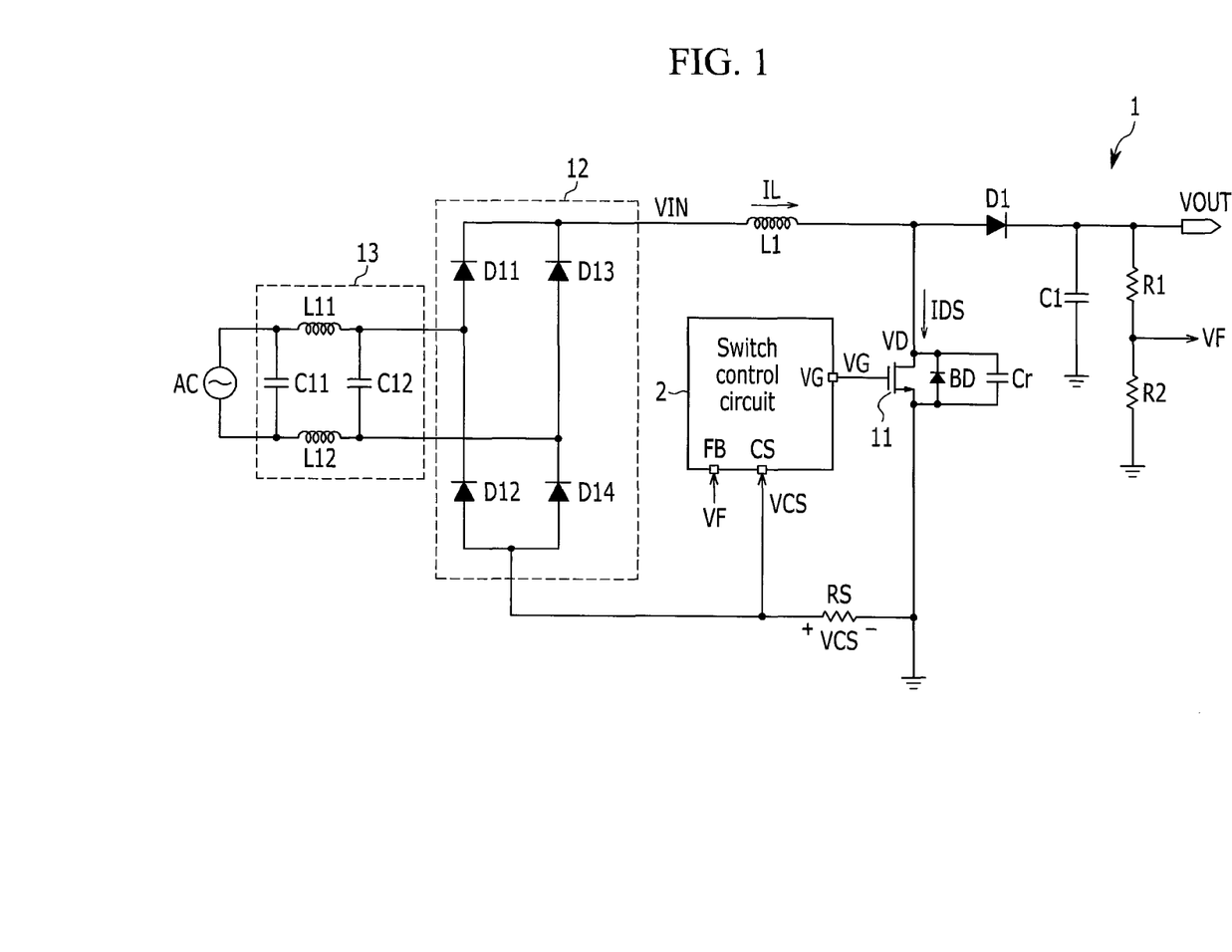
FIG. 1 shows a converter according to an exemplary embodiment of the present invention.

FIG. 1 shows a converter according to an exemplary embodiment of the present invention. In the exemplary embodiment of the present invention, a power factor correction circuit is realized as a boost converter. However, the present invention is not limited thereto.

As shown in FIG. 1, a converter 1 includes a switch control circuit 2, a power switch 11, a bridge diode 12, a line filter 13, a diode D1, a capacitor C1, an inductor L1, and division resistors R1 and R2. The power switch 11 according to the exemplary embodiment of the present invention is formed of an n-channel metal oxide semiconductor field effect transistor (NMOSFET). A body diode BD and a parasitic capacitor Cr are formed between a drain electrode and a source electrode of the power switch 11. A current flowing to the power switch 11 will now be referred to as a drain current (IDS), and a drain electrode voltage of the power switch 11 will be referred to as a drain voltage.

The bridge diode 12 is formed of four diodes D11 to D14, and generates an input voltage VIN by current-rectifying input AC power. An output end of the bridge diode 12 is connected to one end of the inductor L1. The bridge diode 12 is grounded through a sense resistor RS.

The line filter 13 includes two capacitors C11 and C12 connected in parallel to both ends thereof to which the input AC power is applied and two inductors L11 and L12 respectively connected in serial to both ends of the input AC power. The line filter 13 filters electromagnetic wave interference of the input AC power.

An input voltage VIN is input to one end of the inductor L1 and the other end of the inductor L1 is connected to an anode of the diode D1 and a drain electrode of the power switch 11. A cathode of the power switch 11 is grounded, and a gate voltage VG output from the switch control circuit 2 is transmitted to a gate electrode of the power switch 11.

The sense resistor RS is connected between a source electrode of the power switch 11 and an input pin CS of the switch control circuit 2 and a sense voltage VCS is input to the switch control circuit 2 through the input pin CS. The switch control circuit 2 detects a zero current using the sense voltage VCS. A first end of the sense resistor RS is grounded and a second end thereof is connected to the input pin CS, and the sense voltage VCS is a voltage at the second end of the sense resistor RS. Since the drain current IDS flows to the second end of the sense resistor RS to the first end of the sense resistor RS, the sense voltage VS is a negative voltage.

Hereinafter, a direction that the sense voltage VCS is getting close to zero voltage is defined as rising and a direction that the sense voltage VCS is getting far away from the zero voltage is defined as falling.

The input voltage VIN is transmitted to the inductor L1, and output power is generated by a current (hereinafter, an inductor current) flowing to the inductor L1 by the input voltage VIN. The switching operation of the power switch 11 controls the inductor current IL.

During the turn-on period of the power switch 11, the inductor current IL is increased and the inductor L1 stores energy. During the turn-off period of the power switch 11, the inductor current IL flows through the diode D1 so that the energy stored in the inductor L1 is transmitted to the output end of the converter 1. When the power switch 11 is turned off and the diode D1 is connected, the inductor current IL flows to a load connected to an output end of the power factor correction circuit 1 such that the capacitor C1 is charged. Since the inductor current IL supplied to the load is increased as the load connected to the output end of the power factor correction circuit 1 is increased, the current flowing to the capacitor C1 relatively decreased so that the output voltage Vout is relatively decreased. When the load is decreased, the inductor current IL supplied to the load is decreased and thus the current flowing to the capacitor C1 is relatively increased such that the output voltage Vout is relatively increased.

Through such an operation, the output voltage Vout is maintained in a constant level regardless of fluctuation of the load.

When all the energy in the inductor L1 is supplied to the load, the diode D1 is disconnected. Due to resonance between the inductor L1 and the parasite capacitor Cr, a drain voltage of the power switch 11 is decreased. During the turn-off period of the power switch 11, a period during which the inductor current flows inversely due to the resonance between the inductor L1 and the parasite capacitor Cr. During the period, the inductor current flows to the input AC power AC through a body diode BD of the sense resistor RS and the turned-off power switch 11. The sense voltage VCS is higher than zero during the period.

When the power switch 11 is turned on after the drain voltage is decreased, and inductor current IL flows through the power switch 11. During the turn-on period of the power switch 11, a drain current IDS equals the inductor current IL. During the turn-on period of the power switch 11, the inductor current IL is increased with a slope corresponding to the input voltage VIN.

The switch control circuit 2 generates an error amplification signal VCON using a feedback voltage VF divided according to a resistance ratio (R2/(R1+R2)) of the division resistors R1 and R2, and determines a turn-off time point of the power switch 11 by comparing the error amplification signal VCON with a sawtooth wave signal VSAW increasing with a predetermined slope during the turn-on period of the power switch 11. The feedback voltage VF is input to the input pin FB of the switch control circuit 2.

The switch control circuit 2 turns on the power switch 11 at a time point that a voltage at both ends of the power switch 11 is the lowest. Since the source electrode of the power switch 11 is grounded, the voltage at both ends of the power switch 11 is the drain voltage of the power switch 11. The switch control circuit 2 predicts a time point (e.g., a valley point) that the drain voltage becomes the lowest, and turns on the power switch 11 at the valley point.

The switch control circuit 2 according to an exemplary embodiment of the present invention uses the sense voltage VCS to predict the valley point. The sense voltage VCS is a voltage generated according to a current flowing to the power switch 11. The switch control circuit 2 sets the sense voltage VCS at a time point that the drain voltage starts to decrease due to the resonance as an on-reference voltage, and turns on the power switch 11 at a time point that the sense voltage VCS is decreased to the on-reference voltage after reaching the peak level.

The switch control circuit 2 calculates a rising period for the sense voltage VS to reach the peak point from the on-reference voltage in order to detect a time point that the sense voltage VCS is decreased to the on-reference voltage after reaching the peak level. The switch control circuit 2 turns on the power switch after a falling period that is the same as the rising period from the peak level.

Figure 2:
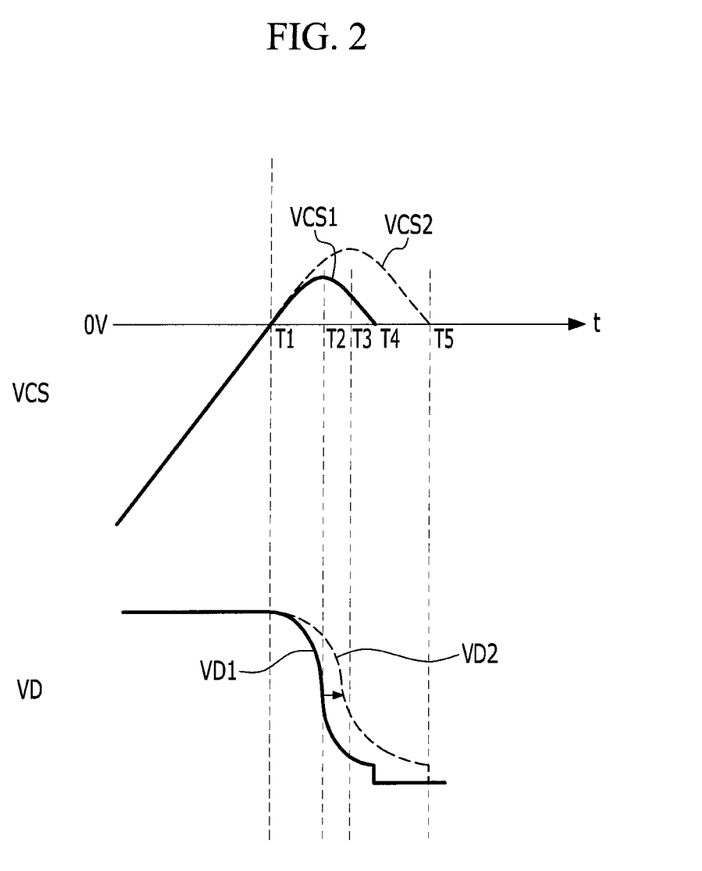
FIG. 2 is a waveform diagram illustrating a sense voltage and a drain voltage.

Further description will now be provided with reference to FIG. 2.

FIG. 2 is a waveform diagram of the sense voltage and the drain voltage. In FIG. 2, the sense voltage and the drain voltage marked by solid lines VCS1 and VD1 are a sense voltage and a drain voltage before the inductance of the inductor L1 and the capacitance of the parasite capacitor Cr are changed, and the sense voltage and the drain voltage marked by dotted lines VCS2 and VD2 are a sense voltage and a drain voltage after the inductance of the inductor L1 and the capacitance of the parasite capacitor Cr are changed.

As shown in FIG. 2, the drain voltage VD is decreased due to the resonance during a period that the inductor current inversely flows. A sense voltage VCS1 has a positive value due to the inversely flowing current.

At a time T1, all the energy of the inductor L1 is supplied to the load so that the diode D1 is disconnected and the resonance starts. In this case, the sense voltage VCS1 reaches zero voltage. The switch control circuit 2 detects a period T1 to T2, that is, a period that the sense voltage VCS1 reaches peak level at a time T2 from the time T1, and turns on the power switch 11 at a time T4, that is, a time that a period equivalent to the period T1 to T2 is passed from the time T2.

When the inductance of the inductor L1 and the capacitance of the parasite capacitor Cr are changed and thus the a resonance frequency is decreased, a decrease slope of the drain voltage VD2 is decreased compared to the drain voltage VD1 and shifted to the right side as shown in FIG. 2. A period during which the sense voltage VCS2 is increased is also extended as much as the decrease slope of the drain voltage VD2 is decreased. For soft switching, the turn-off period of the power switch 11 should be extended as the period during which the sense voltage VCS2 is increased is extended. The switch control circuit 2 detects a period T1 to T3, that is, a period from the time T1 that the sense voltage VCS2 reaches the zero voltage to a time T3 that the sense voltage VCS2 reaches the peak level, and turns on the power switch 11 at a time T5, that is, a time that a period equivalent to the period T1 to T3 is passed from the time T3. According to the exemplary embodiment of the present invention, the on-reference voltage may be zero voltage.

As described, the switch control circuit 2 according to exemplary embodiment of the present invention turns on the power switch 11 at the valley point of the drain voltage VD although the resonance frequency is changed by detecting the sense voltage VCS. Then, hard switching is not occurred.

Figure 3:
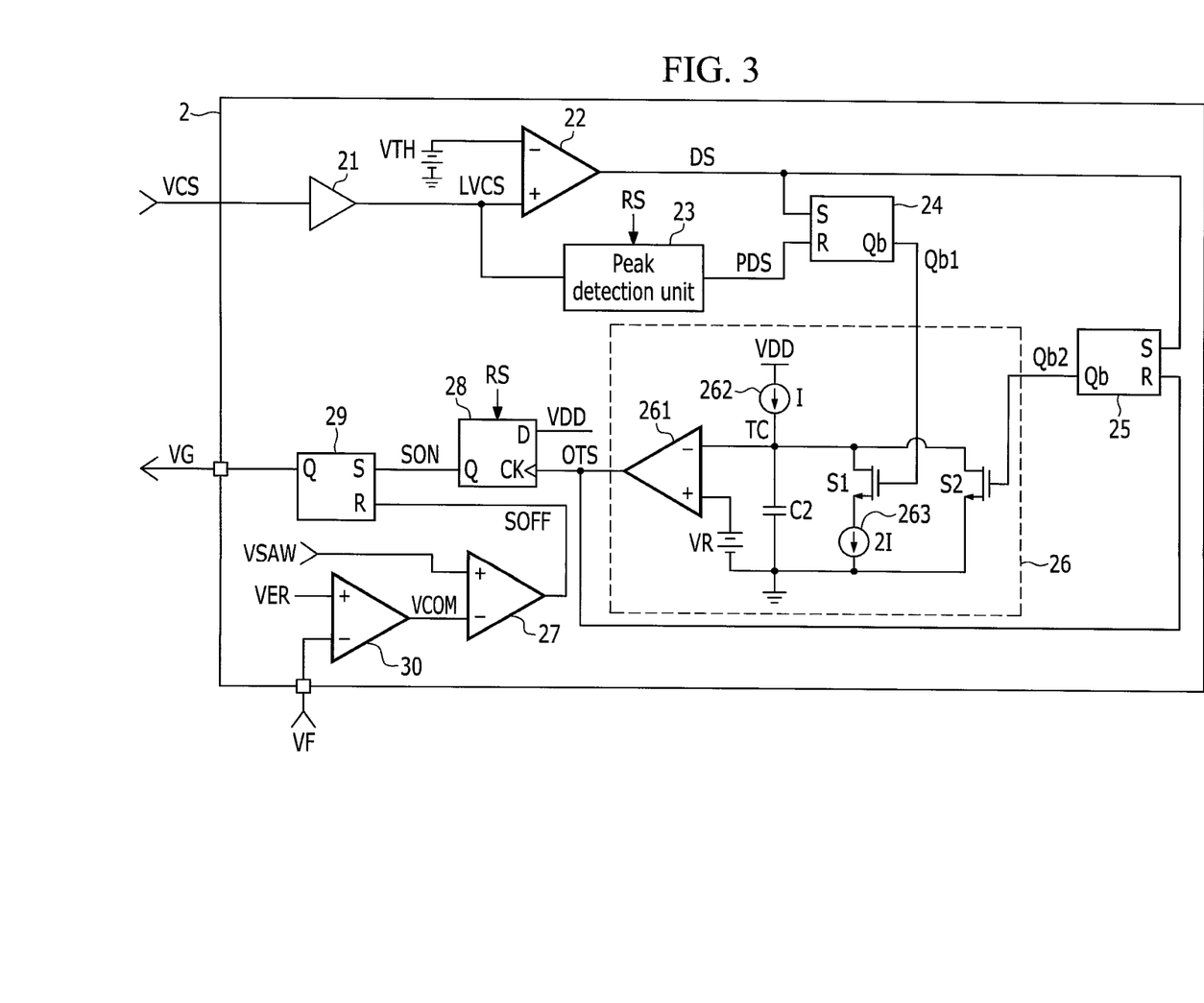
FIG. 3 shows a configuration of a switch control circuit.

Hereinafter, a configuration of the switch control circuit 2 will be described.

FIG. 3 shows a configuration of the switch control circuit.

The switch control circuit 2 includes a level shifter 21, a comparator 22, a peak detection unit 23, a first latch 24, a second latch 25, a timing calculator 26, a D-flipflop 28, a SR latch 29, and an error amplifier 30.

The level shifter 21 generates a shift voltage LVCS by shifting the sense voltage VCS by a predetermined level. Since the sense voltage VCS has a negative value, the sense voltage VCS needs to be shifted to a positive voltage. Thus, the predetermined level should be at least higher that a level that can control the sense voltage VCS to be a positive voltage.

The comparator 22 detects a period that the sense voltage VCS is higher than the on-reference voltage by comparing the shift voltage LVCS with a threshold voltage VTH corresponding to the on-reference voltage. As previously stated, the on-reference voltage is the zero voltage in the exemplary embodiment and therefore the zero voltage will be used instead of the on-reference voltage.

The comparator 22 includes a non-inversion terminal (+) to which the shift voltage LVCS is input and an inversion terminal (−) to which the threshold voltage VTH is input. The comparator 22 generates a high-level detection signal DS when the shift voltage LVCS is higher than the threshold voltage VTH.

The peak detection unit 23 detects the peak point of the shift voltage LVCS, and generates a high-level detection signal PDS from a time point that the peak point is detected to a time point that the power switch 11 is turned off. The peak detection unit 23 resets the signal PDS to low level according to a reset signal RS. The reset signal RS is generated by being synchronized at the turn-off time of the power switch 11.

The first latch 24 generates a first control signal Qb1 that indicates a rising period, that is, the time that the sense voltage VCS reaches the peak point from the time that the sense voltage VCS reaches the zero voltage. The first latch 24 includes a set terminal S to which the first detection signal DS is input and a reset terminal R to which a second detection signal PDS is input, synchronized at a rising edge of the signal input to the set terminal S to generate a low-level control signal Qb1, and synchronized at a rising edge of the signal input to the reset terminal R to generate a high-level first control signal Qb1. The first control signal Qb1 is output through an inversion output end Qb.

The second latch 25 generates a second control signal Qb2 that indicates a sum period calculated by adding the falling period to the rising period according to the first detection signal DS and an on-trigger signal OTS. The second latch 25 includes a set terminal S to which the first detection signal DS is input and a reset terminal R to which the on-trigger signal OTS is input, generates a low-level second control signal Qb2 by being synchronized by a rising edge of the signal input to the set terminal S, and generates a high-level control signal Qb2 by being synchronized by a rising edge of the signal input to the reset terminal R. The second control signal Qb2 is output through the inversion output end Qb.

The timing calculator 26 calculates the rising period and the sum period according to the first control signal Qb1 and the second control signal Qb2, and generates the on-trigger signal that controls the turn-on of the power switch 11 at a time point that the sum period is passed.

The timing calculator 26 generates a timing calculation signal TC that is increased during the rising period according to the first control signal Qb1 and the second control signal Qb2 and decreased during the falling period according to the first control signal Qb1. The timing calculator 26 determines a termination time point of the falling period by comparing the timing calculation signal TC with a predetermined reference voltage VR, and generates the on-trigger signal at a time point that the sum period is passed.

The timing calculator 26 includes a comparator 261, a capacitor C2, a first control signal S1, a second control switch S2, and a discharging current source 263.

The comparator 261 compares the timing calculation signal TC with the reference voltage VR to generate the on-trigger signal OTS. The comparator 261 includes an inversion terminal (−) to which the timing calculation signal. TC and a non-inversion (+) signal to which the reference signal is in input. The comparator 261 generates a high-level on-trigger signal during a period that the timing calculation signal TC is lower than the reference voltage VR, and generates a low-level on-trigger signal during a period that the timing calculation signal TC is higher than the reference voltage VR. For stable comparison operation of the comparator 261, the reference voltage VR may be set to a low-level voltage close to zero voltage.

At a time point that the timing calculation signal TC is decreased to the reference voltage VR, the termination time point of the falling period is determined. At a time point that the timing calculation signal TC reaches the reference voltage VR, a level of the on-trigger signal OTS, that is, an output signal of the comparator 261 is changed and then transmitted to the reset terminal R of the second latch 25 so that a level of the second control signal Qb2 may be changed requiring a predetermined time period. That is, the termination time point of the falling period may be later than the time point that the timing calculation signal TC reaches the reference voltage TR due to internal delay of the comparator 261 and the second latch 25.

Further, a delay may occur between a time point that the sense voltage VCS reaches the peak point and a time point that the detection signal PDS increased to a high level. According to the detection signal PDS, a predetermined time period may be required for the first control signal Qb1 to increase to a high level.

In the exemplary embodiment of the present invention, a ratio of the charging current source 262 and the discharging current source 263 can be controlled, considering the delays. That is, since the rising period may be longer than a period from the time point that the rising sense voltage VCS reaches the zero voltage to the time point of reaching the peak point, the drain voltage VD may not be the lowest voltage at the turn-on time of the power switch 11 by setting the falling period to be the same as the rising period. Thus, in order to correct the increase of the rising period due to the delay, the falling period needs to be shortened and thus the discharging current source 263 may be set to a current two times larger than that of the charging current source 262.

Although the reference voltage VR is set to be higher than zero voltage, the reference voltage is substantially very close to zero voltage. Thus, the time point (time T1 of FIG. 2) that the rising sense voltage VCS reaches zero voltage and the time point that the timing calculation signal TC becomes higher than the reference voltage VR, and the time point that (time T3 of FIG. 3) the falling sense voltage VCS reaches zero voltage and the time pint that the timing calculation signal TC reaches the reference voltage VR are substantially equivalent to each other.

In the exemplary embodiment of the present invention, the reference voltage VR is zero voltage for convenience of description.

The charging current source 262 generates a charging current I using a power source voltage VDD. The charging current source 262 is connected to one end of the capacitor C2.

The first control switch S1 is connected with the discharging current source 263 in series, and first control switch S1 and the discharging current source 263 are connected to the capacitor C2 in parallel.

As a synch current source, the discharging current source 263 generates a discharging current 2I.

The second control switch S2 is connected to the capacitor C2 in parallel.

During a period that the first control switch S1 is in the turn-on state, the capacitor C2 is discharged due to a current difference I between the discharging current source 263 and the charging current source 262.

When the second control switch S2 is turned on, both ends of the capacitor C2 are grounded so that the timing calculation signal TC becomes zero voltage.

The D-flipflop 28 generates an on signal SON by being synchronized by the on-trigger signal OTS. In further detail, the D-flipflop 28 is synchronized at a rising edge of the on-trigger signal OTS and outputs a signal input to an input terminal D through an output terminal Q. The D-flipflop 28 includes the input terminal D to which the power source voltage VDD is input, a clock terminal CK to which the on-trigger signal OTS is input, and the output terminal Q. The D-flipflop 28 is reset by a reset signal RS to reset the on-trigger signal OTS to low level.

A comparator 27 generates an off signal SOFF by comparing a sawtooth wave signal that determines a switching frequency of the power switch 11 with a control voltage VCOM. The sawtooth wave signal VSAW is a signal that is increased with a predetermined slope during the turn-on period of the power switch 11. The comparator 27 generates a high-level off signal SOFF when the sawtooth wave signal VSAW is higher than the control signal VCOM, and generates a low-level off signal SOFF when the sawtooth wave signal VSAW is lower than the control signal VCOM.

An SR-flipflop 29 generates a gate signal VS that turns on the power switch 11 by being synchronized by the on signal SON, and generates a gate signal that turns off the power switch 11 by being synchronized by the off signal SOFF. The SR-flipflop 29 includes a set terminal S to which the on signal SON is input, a reset terminal R to which the off signal SOFF is input, and an output terminal Q to which the gate signal VG is output.

The SR-flipflop 29 generates a high-level output by being synchronized at a rising edge of the signal input to the set terminal S thereof, and generates a low-level output by being synchronized at a rising edge of the signal input to the reset terminal R thereof.

Since the power switch 11 according to exemplary embodiment of the present invention is an n-channel type transistor, the power switch 11 is turned on when the gate signal VG is high level and turned off when the gate signal VS is low level.

Thus, the power switch 11 is turned on at a rising time point of the on signal SON, and turned off at a rising time point of the off signal SOFF.

The error amplifier 30 generates a comparison voltage VCOM by amplifying an error between the feedback voltage VF and an error reference voltage VER. The feedback voltage VF is input to an inversion terminal (−) of the error amplifier 30 and the error reference voltage VER is input to a non-inversion terminal (+) thereof. The error amplifier 30 generates the comparison voltage VCOM by amplifying a voltage obtained by subtracting the feedback voltage VF from the error reference voltage VER.

When the load is increased, the feedback voltage VF is decreased and the comparison voltage VCOM is increased. Then, a period for the sawtooth wave signal VSAW to reach the comparison voltage VCOM is increased so that the turn-on time period of the power switch 11 is increased such that energy stored in the inductor L1 is increased.

On the contrary, when the load is decreased, the feedback voltage VF is increased and the comparison voltage VCOM is decreased. Then, the period for the sawtooth wave signal VSAW to reach the comparison voltage VCOM is decreased so that the turn-on period of the power switch 11 is decreased such that the energy stored in the inductor L1 is decreased.

Hereinafter, the switching operation of the power switch 11 according to the exemplary embodiment of the present invention will be described with reference to FIG. 4.

Figure 4:
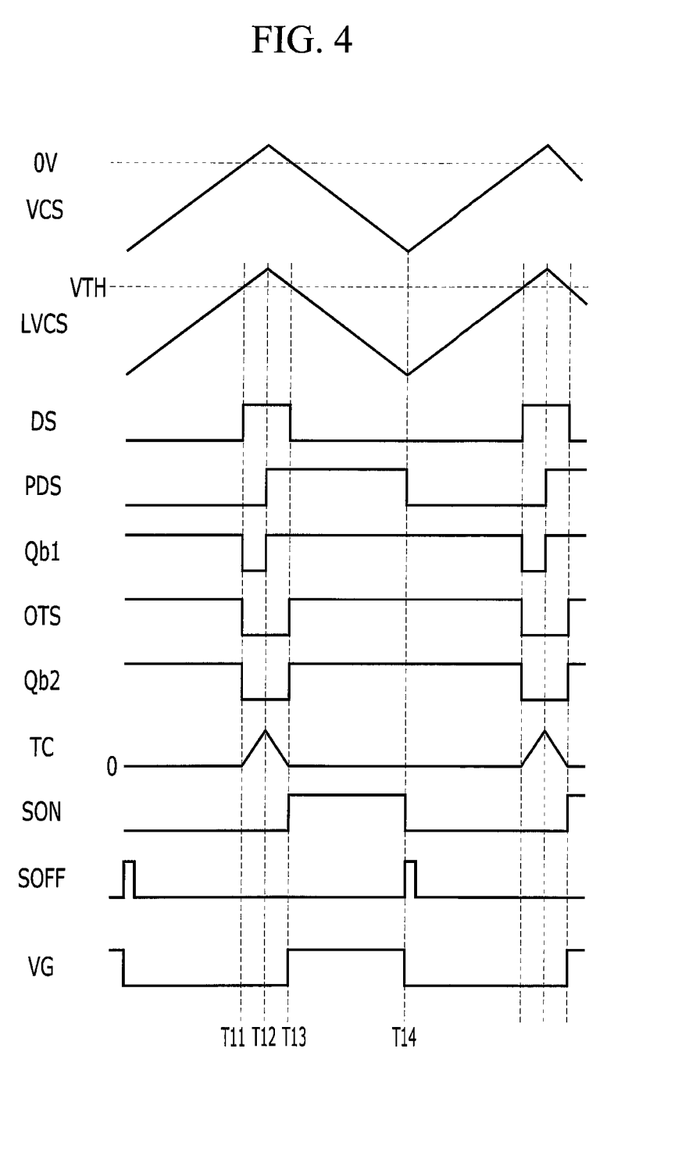
FIG. 4 is a waveform diagram of a sense voltage, a shift voltage, a detection voltage, a first control signal, a second control signal, an on-trigger signal, a time calculation signal, and an on signal.

FIG. 4 is a graph illustrating the sense voltage, the shift voltage, the detection signal, the first control signal, the second control signal, the on-trigger signal, the timing calculation signal, and the on signal.

When the sense voltage VCS reaches zero voltage at a time T11, the shift voltage LVCS reaches the threshold voltage VTH. Then, the detection signal DS is increased to high level. Since high-level signals are input to the set terminals S of the first and second latches 24 and 25, the first control signal Qb1 and the second control signal Qb2 become low level. Then, the first and second control switches S1 and S2 are turned off at the time T11 so that the capacitor C2 is charged by the charging current I.

The timing calculation signal TC starts to increase according to charging of the capacitor C2 from the time T11, and the comparator 261 generates a low-level on-trigger signal OTS at a time point that the timing calculation signal TC becomes higher than the reference voltage VR.

When the sense voltage VCS reaches the peak point at a time T12, the detection signal PDS is increased to high level. Since a high-level detection signal PDS is input to the reset terminal of the first latch 24, the first control signal Qb1 is increased to high level. Then, the first control switch S1 is turned on at the time T12.

Since the discharging current 2I is two times larger than that charging current I, the capacitor C2 is discharged by a current I that is a difference between the two currents. That is, a charging current of the capacitor C1 during the rising period and a discharging current of the capacitor C2 during the falling period are equivalent to each other. A rising slope of the timing calculation signal TC during the rising period and a falling slope of the timing calculation signal TC during the falling period are equivalent to each other.

An internal delay of the switch control circuit is not considered for convenience of description, and thus a ratio between the charging current I and the discharging current 2I may not be limited to 1:2 when the internal delay is considered.

When the sense voltage VCS reaches zero voltage at a time T13, the shift voltage LVCS also reaches the threshold voltage VTH. Since the shift voltage LVCS becomes lower than the threshold voltage VTH after the time T13, the detection signal DS becomes low level. In addition, the timing calculation signal TC becomes lower than the reference voltage VR at the time T13, and the on-trigger signal OTS is increased to high level.

Since the high-level on-trigger signal OTS is input to the reset terminal R of the second latch 25 at the time T13, the second control signal Qb2 becomes high level and the second control switch S2 is turned on. Then, the timing calculation signal TC becomes zero voltage. The rising edge of the on-trigger signal OTS is generated at the time T13 so that the D-flipflop 28 generates the on signal ON according to the power source voltage VDD. Since the power voltage VDD is high level, the on signal SON is increased to high level at the time T13.

At the time T13, the on signal SON is increased to high level and the gate signal VG becomes high level such that the power switch 11 is turned on. Then, the sense voltage VCS is decreased according to the drain current IDS so that the shift voltage LVCS is decreased.

At a time T14, the sawtooth wave signal VSAW reaches the comparison signal VCOM and thus the off signal SOFF become a high-level pulse, and the gate signal VG becomes low level so that the power switch 11 is turned off.

At the time T14, the reset signal RS is also generated and thus the peak detection unit 23 and the D-flipflop 28 are reset so that the detection signal PDS and the on signal SON become low level.

As described, a period from the time point that the sense voltage VCS becomes zero voltage to the time point that the sense voltage VCS reaches the peak point is calculated, and the power switch 11 is turned on after a period that is the same as the calculated period is passed. Then, the power switch 11 is turned on at the valley point of the drain voltage VD so that the hard-switching can be prevented and the power switch 11 is soft-switched.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS converter 1, switch control circuit 2, power switch 11, inductor L1, L11, L12
sense resistor RS, body diode BD, parasite capacitor Cr, bridge diode 12
line filter 13, diode D1, D11-D14, capacitor C1, C11, C12, C2
level shifter 21, comparator 22, peak detection unit 23, first latch 24, second latch 25 timing calculator 26, D-flipflop 28, SR latch 29, comparator 261 first control switch S1, second control switch S2, charging current source 262 discharging current source 263, error amplifier 30

What is claimed is:

1. A converter having an inductor to which an input voltage rectified from an AC input is transmitted, and generating an output voltage using an inductor current by the input voltage, comprising:
   a power switch connected to an inductor and controlling the inductor current;
   a sense resistor including a first end connected to the power switch and the ground and a second end connected to the AC input; and
   a switch control circuit turning on the power switch at a time point that a sense voltage generated in the sense resistor is decreased to an on-reference voltage after reaching a peak point,
   wherein the switch control circuit calculates a rising period that is from a time point when the sense voltage reaches the on-reference voltage to a time point when the sense voltage reaches the peak point, and turns on the power switch after a falling period that is the same as when the calculated rising period has passed from the peak point.

2. The converter of claim 1, wherein the switch control circuit comprises:
   a level shifter generating a shift voltage by shifting the sense voltage by a predetermined level;
   a first comparator generating a first detection signal according to a comparison between the shift voltage and a threshold voltage that corresponds to the on-reference voltage;
   a peak detection unit generating a second detection signal by detecting a peak point of the shift voltage;
   a first latch generating a first control signal that indicates a rising period according to the first detection signal and the second detection signal;
   a second latch generating a second control signal indicating a sum period of the rising period and the falling period according to the first detection signal and an on-trigger signal; and
   a timing calculator calculating the rising period and the sum period according to the first control signal and the second control signal, and generating the on-trigger signal that controls turn-on of the power switch at a time point after the sum period is passed.

3. The converter of claim 2, wherein the timing calculator generates a timing calculating signal that is increased during the rising period by the first and second control signals and decreased during the falling period by the first control signal, and sets a time point that the timing calculation signal is decreased to a predetermined reference voltage to a termination time point of the falling period.

4. The converter of claim 2, wherein the timing calculator comprises:
   a charging current source generating a charging current;
   a capacitor including a first end connected to the charging current source and a second end being grounded;
   a first control switch performing switching operation according to the first control signal, and including a first end connected to the first end of the capacitor;
   a second control switch performing switching operation according to the second control signal, and connected to the capacitor in parallel;
   a discharging current source connected to the second end of the first control switch; and
   a second comparator including a first input end connected to the first end of the capacitor and a second input end to which the reference voltage is input,
   wherein the timing calculation signal is a voltage at the first end of the capacitor, and the charging current source and the discharging current source are set to control a time point that the sense voltage is decreased to the on-reference voltage after reaching the peak point and the termination time point of the falling period to be equivalent to each other.

5. The converter of claim 2, wherein the switch control circuit comprises:
   a D-flipflop being synchronized by the on-trigger signal to generate an on signal for turning on the power switch;
   a third comparator generating an off signal to turn off the power switch when a sawtooth wave signal increasing during the turn-on period of the power switch reaches a comparison voltage that corresponds to a difference between a feedback voltage corresponding to the output voltage and a predetermined error reference voltage; and
   an SR-flipflop generating a gate signal for switching operation of the power switch according to the on signal and the off signal.

6. The converter of claim 5, wherein the D-flipflop is reset at a turn-off time point of the power switch.

7. The converter of claim 2, wherein the peak detection unit is reset at a turn-off time point of the power switch.

8. A switch control circuit having an inductor to which an input voltage rectified from an AC input is transmitted, and controlling switching operation of a power switch that controls generation of an output voltage using an inductor current by the input voltage, comprising:
   a peak detection unit detecting a time point that a sense voltage corresponding to a current flowing to the power switch reaches a peak point; and
   a timing calculator generating an on-trigger signal to turn on the power switch at a first time at which the sense voltage is decreased to a predetermined on-reference voltage after the peak point has been detected,
   wherein the sense voltage is generated by a sense resistor including a first end connected to the power switch and a ground and a second end connected to the AC input, and
   the on-reference voltage is a voltage at a resonance start point between a parasitic capacitor of the power switch and the inductor.

9. The switch control circuit of claim 8, further comprising:
   a first latch generating a first control signal indicating a rising period from a second time point when the sense voltage reaches the on-reference voltage before the peak point has been detected to a following time point when the peak point has been detected,
   wherein the timing calculator generates the on-trigger signal at a time point when a falling period that is the same as the rising period is passed using the first control signal.

10. The switch control circuit of claim 9, further comprising:
    a level shifter generating a shift voltage by shifting the sense voltage by a predetermined level; and
    a first comparator generating a first detection signal according to a result of comparing the shift voltage to the threshold voltage corresponding to the on-reference voltage,
    wherein the peak detection unit generates a second detection signal by detecting a peak point of the shift voltage, and the first latch generates a first control signal indicating a rising period according to the first and second detection signals.

11. The switch control circuit of claim 10, further comprising a second latch generating a second control signal that indicates a sum period of the rising period and the falling period according to the first detection signal and the on-trigger signal, wherein the timing calculator generates a timing calculation signal that is increased during the rising period by the first and second control signals and decreased during the falling period by the first control signal, and sets a time point that the timing calculation signal is decreased to a predetermined reference voltage as a termination time point of the falling period.

12. The switch control circuit of claim 11, wherein the timing calculator comprises:
  a charging current source generating a charging current;
  a capacitor including a first end connected to the charging current source and a second end being grounded;
  a first control switch performing switching operation according to the first control signal and including a first end connected to the first end of the capacitor;
  a second control switch performing switching operation according to the second control signal and connected to the capacitor in parallel;
  a discharging current source connected to the second end of the first control switch; and
  a second comparator including a first input end connected to the first end of the capacitor and a second input end to which the reference voltage is input,
  wherein the timing calculation signal is a voltage at the first end of the capacitor, and the charging current source and the discharging current source are set to control a time point that the sense voltage is decreased to the on-reference voltage after reaching the peak point to be equivalent to the termination time point of the falling period.

13. The switch control circuit of claim 8, further comprising:
  a D-flipflop generating an on signal synchronized by the on-trigger signal to turn on the power switch;
  a third comparator generating an off signal to turn off the power switch when a sawtooth wave signal increasing during the turn-on period of the power switch reaches a comparison voltage that corresponds to a difference between a feedback voltage corresponding to the output voltage and a predetermined error reference voltage; and
  an SR-flipflop generating a gate signal that control the power switch to perform switching operation according to the on signal and the off signal.

14. The switch control circuit of claim 13, wherein the D-flipflop is reset at the turn-off time point of the power switch.

15. The switch control circuit of claim 8, wherein the peak detection unit is reset at the turn-off time point of the power switch.

16. A switch control method for controlling switching operation of a power switch having an inductor receiving an input voltage rectified from an AC input, and controlling output voltage generation with an inductor current by the input voltage, comprising:
  detecting a first time point that a sense voltage corresponding to a current flowing to the power switch reaches a predetermined on-reference voltage;
  detecting a peak point of the sense voltage; and
  turning-on the power switch when a second period that is equivalent to a first period is passed, the first period is a period from the first time point to the peak point, wherein the sense voltage is generated by a sense resistor including a first end connected to the power switch and a ground and a second end connected to the AC input, and the on-reference voltage is a voltage at a resonance start time point between a parasitic capacitor of the power switch and the inductor.

17. The switch control method of claim 16, wherein the turning-on of the power switch comprises:
  generating a timing calculation signal that is increased during the first period and decreased during the second period; and
  setting a time point that the timing calculation signal is decreased to a predetermined reference voltage as a termination time point of the second period.

18. The switch control method of claim 16, further comprising generating a shift voltage by shifting the sense voltage by a predetermined level,
  wherein the detecting of the first period is performed according to a result of comparison between the shift voltage and a threshold voltage corresponding to the on-reference voltage, and the detecting of the peak point is performed by detecting the peak point of the shift voltage.

19. The switch control method of claim 16, further comprising
  turning off the power switch when a sawtooth wave signal increasing during the turn-on period of the power switch reaches a comparison voltage that corresponds to a difference between a feedback voltage corresponding to the output voltage and a predetermined error reference voltage,
  wherein the detecting of the peak point comprises generating a detection signal which is a pulse during the peak point of the shift voltage to the turn-off time point of the power switch, and the turning on of the power switch comprises setting a period from the first time point to a time point that the detection signal is generated to the first period.

\* \* \* \* \*